United States Patent
Wang et al.

(10) Patent No.: US 10,712,845 B2
(45) Date of Patent: Jul. 14, 2020

(54) TOUCH SUBSTRATE AND METHOD OF PRODUCING THE SAME, AND TOUCH PANEL AND METHOD OF PRODUCING THE SAME, AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Jing Wang, Beijing (CN); Shuncheng Zhu, Beijing (CN); Dong Li, Beijing (CN); Zouming Xu, Beijing (CN); Xiaodong Xie, Beijing (CN); Min He, Beijing (CN); Jian Tian, Beijing (CN); Qitao Zheng, Beijing (CN); Yaying Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 15 days.

(21) Appl. No.: 15/963,063

(22) Filed: Apr. 25, 2018

(65) Prior Publication Data
US 2019/0056812 A1    Feb. 21, 2019

(30) Foreign Application Priority Data
Aug. 15, 2017    (CN) .......................... 2017 1 0698975

(51) Int. Cl.
*H05K 3/20* (2006.01)
*G06F 3/041* (2006.01)
*G06F 3/044* (2006.01)

(52) U.S. Cl.
CPC .............. *G06F 3/041* (2013.01); *G06F 3/044* (2013.01); *G06F 2203/04103* (2013.01); *Y10T 29/49128* (2015.01)

(58) Field of Classification Search
CPC ..................... G06F 3/041; G06F 3/044; G06F 2203/04103; Y10T 29/49128; Y10T 29/49155
USPC .................................................... 29/831, 846
See application file for complete search history.

(56) References Cited

U.S. PATENT DOCUMENTS

| | | | | |
|---|---|---|---|---|
| 8,717,330 B2 * | 5/2014 | Lu | ............................ | G06F 3/044 174/254 |
| 2015/0331531 A1 * | 11/2015 | Aoyama | .................. | G06F 3/044 345/174 |

* cited by examiner

*Primary Examiner* — Donghai D Nguyen
(74) *Attorney, Agent, or Firm* — Kinney & Lange, P.A.

(57) ABSTRACT

The present disclosure relates to a touch substrate and a method of producing the same, and a touch panel and a method of producing the same, and a display device. In an embodiment, a method of producing a touch substrate comprises steps of: forming a flexible film sheet with a metal wiring pattern, the metal wiring pattern comprising metal wirings and metal bonding electrodes connected to the metal wirings respectively; forming a glass substrate on which a touch electrode structure and touch bonding electrodes in an electrical connection with the touch electrode structure are formed, both a sheet resistance of the touch electrode structure and a sheet resistance of the touch bonding electrodes ranging from 12 Ω/□ to 70 Ω/□; and aligning and bonding the flexible film sheet with the glass substrate.

11 Claims, 5 Drawing Sheets

TOUCH SUBSTRATE AND METHOD OF PRODUCING THE SAME, AND TOUCH PANEL AND METHOD OF PRODUCING THE SAME, AND DISPLAY DEVICE

CROSS-REFERENCE TO RELATED APPLICATION

This application claims the priority benefit of Chinese Patent Application No. 201710698975.x filed on Aug. 15, 2017 in the State Intellectual Property Office of China, the whole disclosure of which is incorporated herein by reference.

BACKGROUND

Technical Field

The present disclosure relates to the field of display technologies, and in particular to a touch substrate and a method of producing the same, and a touch panel and a method of producing the same, and a display device.

Description of the Related Art

With continuous development of flexible display technology, flexible display products used in high-end smart phones and next-generation wearable display systems also need to be equipped with flexible touch electrodes, i.e. flexible sensors.

A main structure of the flexible sensor is designed as GF2 bridging structure, GF bridging structure and F-MLOC. GF2 (Glass-Film 2) is to produce a touch driving electrode (Tx) a side of a single-layer flexible film and to produce a touch sensing electrode (Rx) on the other side of a single-layer flexible film. GF (Glass-Film) is to produce a plurality of cross-arranged Tx electrodes and Rx electrodes on the same side of the flexible film, and to electrically connect disconnected Tx electrodes or Rx electrodes together through a bridging design. F-MLOC (Flexible Multilayer on Cell) is to produce directly multiple flexible layers on a surface of a display module.

SUMMARY

According to an aspect of the present disclosure, there is provided a method of producing a touch substrate. The method comprises steps of: forming a flexible film sheet with a metal wiring pattern, the metal wiring pattern comprising metal wirings and metal bonding electrodes connected to the metal wirings respectively; forming a glass substrate on which a touch electrode structure and touch bonding electrodes in an electrical connection with the touch electrode structure are formed, both a sheet resistance of the touch electrode structure and a sheet resistance of the touch bonding electrodes ranging from 12 Ω/□ to 70 Ω/□; and aligning and bonding the flexible film sheet with the glass substrate.

In some embodiments, the step of forming a flexible film sheet with a metal wiring pattern comprises steps of: bonding a flexible film onto a glass motherboard with an adhesive; dividing the flexible film into at least one first region; forming the metal wiring pattern in each of the at least one first region; stripping the flexible film from the adhesive; and cutting the flexible film along boundary of the at least one first region to form at least one flexible film sheet with the metal wiring pattern.

In some embodiments, the step of forming a glass substrate on which a touch electrode structure and touch bonding electrodes in an electrical connection with the touch electrode structure are formed comprises steps of: recovering the glass motherboard and removing the adhesive remaining on the glass motherboard; dividing the glass motherboard into at least one second region; forming the touch electrode structure and the touch bonding electrodes in each second region; and cutting the glass motherboard along boundary of the at least one second region to form at least one glass substrate on which the touch electrode structure and the touch bonding electrodes in an electrical connection with the touch electrode structure are formed.

In some embodiments, the step of forming the touch electrode structure and the touch bonding electrodes in each second region comprises steps of: forming a plurality of first electrodes arranged in parallel with each other, a plurality of second electrodes arranged in parallel with each other, a plurality of first touch bonding electrodes connected to the plurality of first electrodes respectively, and a plurality of second touch bonding electrodes connected to the plurality of second electrodes respectively, the plurality of first electrodes intersecting with the plurality of second electrodes, each of the first electrodes comprising a plurality of first sub-electrodes connected electrically to each other successively, each of the second electrodes comprising a plurality of second sub-electrodes separated from each other by the first electrodes; forming a protective layer which covers at least intersected regions of the first electrodes and the second electrodes; and forming a plurality of bridging electrodes on the protective layer, each of the bridging electrodes being electrically connected to two adjacent second sub-electrodes of one second electrode.

In some embodiments, before the step of forming the touch electrode structure and the touch bonding electrodes in each second region, the method further comprises a step of: forming a pattern blanking layer covering each second region on the glass motherboard.

In some embodiments, the protective layer covers the entire second region, and the method further comprises a step of: etching the protective layer to form via holes which expose a part of each of the second sub-electrodes and expose the plurality of touch bonding electrodes, the bridging electrodes being electrically connected to the second sub-electrodes through the via holes.

In some embodiments, the step of aligning and bonding the flexible film sheet with the glass substrate comprises steps of: bonding an anisotropic conductive adhesive onto a region of the glass substrate where the touch bonding electrodes are formed or a region of the flexible film sheet where the metal bonding electrodes are formed; aligning the flexible film sheet with the glass substrate to align the touch bonding electrodes with the metal bonding electrodes; and pressing the flexible film sheet against the glass substrate so as to electrically connect the metal bonding electrodes with the touch bonding electrodes through the anisotropic conductive adhesive.

According to another aspect of the present disclosure, there is provided a method of a touch panel. The touch panel comprises a touch substrate and a cover plate on the touch substrate, and the producing method comprises steps of: producing the touch substrate by using the producing method of the above aspect, in the touch substrate, a profile of the flexible film sheet being larger than a profile of the glass substrate, the flexible film sheet further comprising at least one edge region which is not bonded with a surface of the glass substrate facing towards the flexible film sheet; and pressing the cover plate with a curved edge against a surface of the flexible film sheet facing away from the glass substrate, so that the edge region of the flexible film sheet is curved towards the glass substrate and conforms to the curved edge of the cover plate.

In some embodiments, before the step of pressing the cover plate with the curved edge against the surface of the flexible film sheet facing away from the glass substrate, the method further comprises a step of: forming at least one of a polarizer layer and an ink layer on the surface of the flexible film sheet facing away from the glass substrate.

In some embodiments, the edge region of the flexible film sheet is at least positioned at two opposite sides of the glass substrate.

In some embodiments, the metal wirings are at least positioned in the edge region of the flexible film sheet.

According to yet another aspect of the present disclosure, there is provided a touch substrate. The touch substrate comprises a flexible film sheet and a glass substrate opposite to each other, a metal wiring pattern is provided on a side of the flexible film sheet facing towards the glass substrate, the metal wiring pattern comprising metal wirings and metal bonding electrodes connected to the metal wirings respectively; a touch electrode structure and touch bonding electrodes in an electrical connection with the touch electrode structure are provided on a side of the glass substrate facing towards the flexible film sheet, both a sheet resistance of the touch electrode structure and a sheet resistance of the touch bonding electrodes ranging from 12 Ω/□ to 70 Ω/□; and the metal bonding electrodes are electrically connected to the touch bonding electrodes respectively.

In some embodiments, an anisotropic conductive adhesive between the metal wiring pattern and the touch bonding electrodes, the anisotropic conductive adhesive connecting electrically the metal bonding electrodes with the touch bonding electrodes.

In some embodiments, a profile of the flexible film sheet is larger than a profile of the glass substrate, and the flexible film sheet further comprises at least one edge region which is not bonded with a surface of the glass substrate facing towards the flexible film sheet.

According to still another aspect of the present disclosure, there is provided a touch panel comprising the touch substrate of the above aspect.

In some embodiments, a profile of the flexible film sheet is larger than a profile of the glass substrate, and the flexible film sheet further comprises at least one edge region which is not bonded with a surface of the glass substrate facing towards the flexible film sheet; and the touch panel further comprise a cover plate with a curved edge, the cover plate being pressed against a surface of the flexible film sheet facing away from the glass substrate so that the edge region of the flexible film sheet is curved towards the glass substrate and conform to the curved edge of the cover plate.

In some embodiments, the edge region of the flexible film sheet is at least positioned at two opposite sides of the glass substrate.

In some embodiments, the touch panel further comprises at least one of a polarized layer and an ink layer between the flexible film sheet and the cover plate.

According to still yet another aspect of the present disclosure, there is provided a display device. The display device comprises: a display panel; and a touch panel of the above aspect, the display panel is positioned at a side of the glass substrate facing away from the flexible film sheet.

BRIEF DESCRIPTION OF THE DRAWINGS

In order to more clearly describe technical solutions of embodiments of the disclosure or in the related art, accompanying drawings used in the description of the embodiments or the related art will be briefly described below. Obviously, the drawings in the following description are only certain embodiments of the present disclosure, those skilled in the art can also obtain other drawings based on these drawings without any creative work.

DETAILED DESCRIPTION OF PREFERRED EMBODIMENTS

Figure 1:
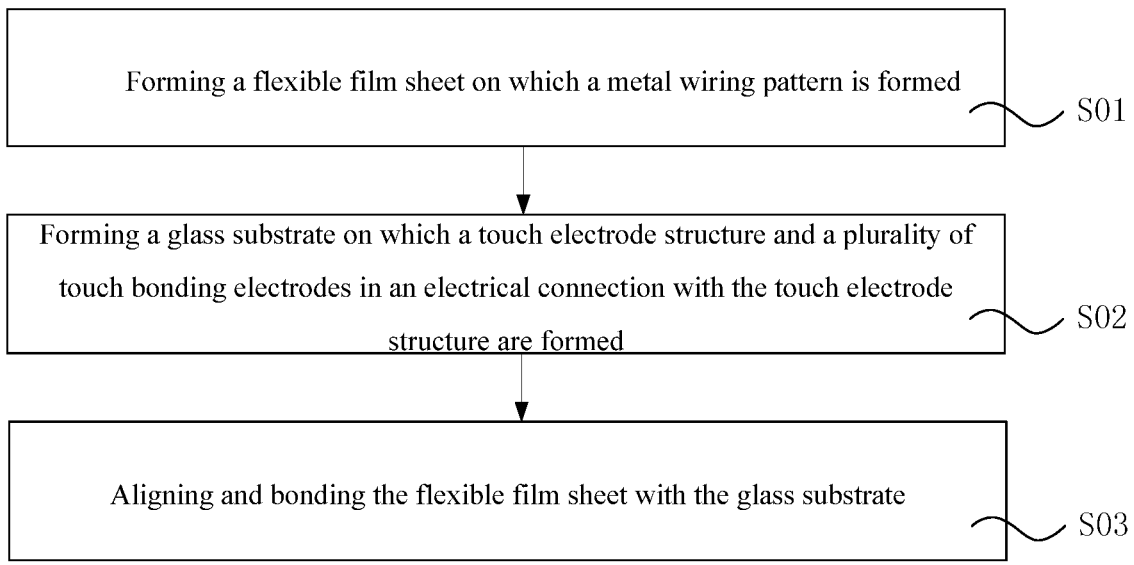
FIG. 1 is a flow chart of a producing method of a touch substrate according to an embodiment of the present disclosure.

Technical solutions of embodiments of the present disclosure will be clearly and completely described with reference to accompanying drawings of the embodiments of the present disclosure. Apparently, the described embodiments are merely a part of the embodiments of the present disclosure, rather than all of the embodiments. All other embodiments obtained by those skilled in the art based on the embodiments of the present disclosure without creative efforts shall fall within the scope of the present disclosure.

It should be noted that, unless otherwise defined, all terms (including technical and scientific terms) used in the embodiments of the present disclosure have the same meaning as commonly understood by those skilled in the art to which the present disclosure pertains. It should also be understood that terms such as those defined in a typical dictionary should be construed as having a meaning that is consistent with their meaning in the context of the related art without being interpreted in an idealized or overly formal sense, unless expressly defined herein.

For example, the terms "first", "second" and the like, as used in the description and claims of the present disclosure, do not denote any order, quantity, or importance, but are only used to distinguish between different components. The use of "including" or "comprising" and the like means that the presence of an element or item preceding the word encompasses any element or item listed after the word or its equivalence, and does not exclude other elements or items. Terms of orientation or positional relationship indicated by "up/upward", "down/downward", "a side", "another side" or the like are based on the orientation or positional relationship shown in the drawings, and are merely for ease of explanation of the present disclosure, but do not indicate or imply that the designated device or element must have a specific orientation, be constructed and operated in a specific orientation, and therefore should not be construed as limiting the present disclosure.

In related art, a GF bridging structure is enabled to meet requirements of flexible display products with small curvature (i.e. curved to a large extent) regarding a flexible sensor as both Tx electrodes and Rx electrodes are provided at the same side of the flexible film in the GF bridging structure. Also, the flexible sensor may be produced in a sheet manner in the GF bridging structure. Thus, the GF bridging structure has a broader application prospect and becomes a mainstream technical route for current producing process of flexible products.

The Applicant has found that the flexible sensor designed using the GF bridging structure in the related art mainly has the following problems:

In the GF bridging structure, an ITO (Indium Tin Oxide) conductive film which is to be patterned to form the Tx and Rx electrodes is deposited on a surface of the flexible film in a sheet manner. Since the flexible film is generally formed of an organic material such as Cop (Cycloolefin Polymer), it is difficult to withstand a high temperature process for forming the ITO conductive film. Therefore, the ITO conductive film may only be deposited with a relatively small power, and correspondingly, a thickness of the formed film is small, it is about 300 Å, making a sheet resistance (also called surface resistance) of the ITO conductive film large, up to 100 Ω/□. As a result, a signal on the touch electrode attenuates greatly, and a low power consumption of the flexible display product cannot be satisfied.

In order to overcome the above problems, the present disclosure provides a touch substrate and a producing method thereof, a touch panel and a producing method thereof, and a display device.

FIG. 1 is flow chart of a producing method of a touch panel according to an embodiment of the present disclosure. As shown in FIG. 1, the embodiment of the present disclosure provides a producing method of a touch panel. The producing method may include:

step S01: forming a flexible film sheet on which a metal wiring pattern is formed, the metal wiring pattern 3 comprising metal wirings 32 and a plurality of metal bonding electrodes 31 connected to the metal wirings respectively;

step S02: forming a glass substrate on which a touch electrode structure and a plurality of touch bonding electrodes in an electrical connection with the touch electrode structure are formed, both a sheet resistance of the touch electrode structure 4 and a sheet resistance of the plurality of touch bonding electrodes 7 ranging from 12 Ω/□ to 70 Ω/□; and step S03: aligning and bonding the flexible film sheet with the glass substrate.

A surface of the flexible film sheet on which the metal wiring pattern 3 is formed faces towards a surface of the glass substrate on which the touch electrode structure 4 and the plurality of touch bonding electrodes 7 in an electrical connection with the touch electrode structure are formed. The flexible film is aligned with and bonded with the glass substrate. The plurality of metal bonding electrodes 31 are bonded with and electrically connected with the plurality of touch bonding electrodes 7, respectively.

It should be noted that a surface of purchased Cop raw material is commonly provided with a layer of ITO conductive film since the ITO conductive film on the flexible film is patterned to form the Tx electrodes and the Rx electrodes in the related art, so that the raw material cost is high. In contrast, in the step S01 provided in the embodiment of the present disclosure, only metal plating, exposure and etching processes are required to act on a surface of a common flexible material to fabricate a desired metal wiring pattern, and the metal wiring pattern may include metal wirings and metal bonding electrodes (i.e. metal bonding pads) connected to the metal wirings respectively, thereby eliminating the need for more expensive Cop materials with the ITO film, which reduces the raw material cost.

In addition, since it is required to bond the flexible film sheet with the subsequently formed glass substrate having the touch electrode structure and the touch bonding electrodes, bonding marks may be formed on the flexible film sheet in the step S01 to increase an alignment accuracy of the bonding.

The bonding marks may be formed when the metal wiring pattern is formed by etching through one patterning process. In other words, the bonding marks may be formed at the same time when the metal wiring pattern is formed. The bonding marks may be formed from metal material from which the metal wiring pattern is formed. Alternatively, the bonding marks may be formed through additional process and from other material which is not limited herein. As long as the bonding marks can be identified in the bonding and alignment process, the specific structure thereof may follow related designs in the related art.

Further, since the touch electrode structure and the touch bonding electrodes are formed on the rigid glass substrate, rather than the flexible film sheet, and the glass substrate may withstand the high temperature for forming the ITO conductive film, the ITO conductive film which is patterned to form the touch electrode structure and the touch bonding electrodes may be formed with a relatively large power into a large thickness, so that the sheet resistance of the electrodes may be reduced due to the large thickness.

Thus, by using the producing method of the touch substrate according to the embodiment of the present disclosure, the ITO conductive film with large thickness and low sheet resistance may be produced on the glass substrate, and both the sheet resistance of the touch electrode structure and the sheet resistance of the touch bonding electrodes may be reduced to a range from 12 Ω/□ to 70 Ω/□, so that a power consumption of a touch product may be significantly reduced.

Figure 2:
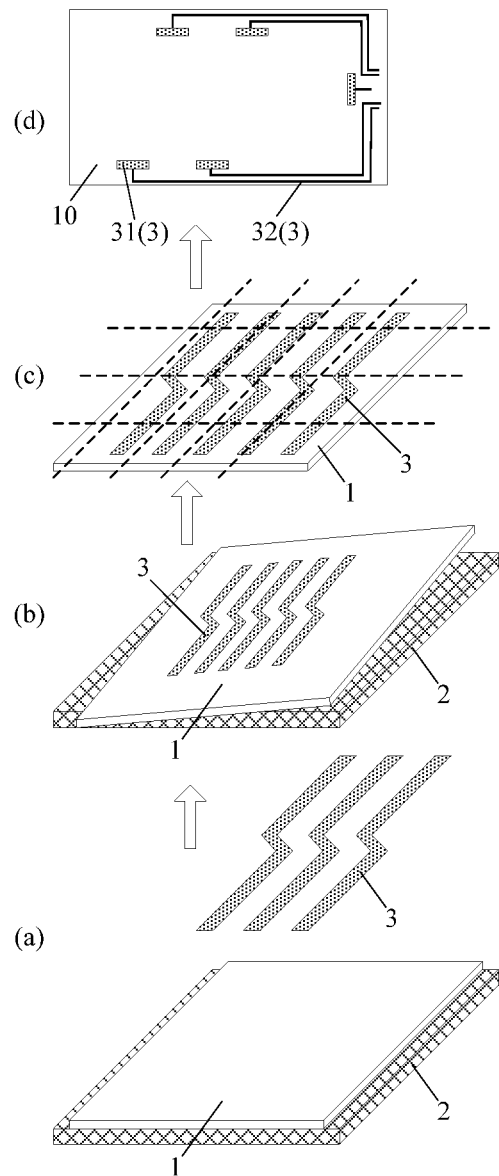
FIG. 2 is a schematic view of corresponding structures in sub-steps of the step S01 of the producing method in FIG. 1.

FIG. 2 is a schematic view of corresponding structures in sub-steps of the step S01 of the producing method in FIG. 1. The step S01 may specifically include the following sub-steps:

sub-step a-1: bonding a flexible film 1 onto a glass motherboard 2 with an adhesive; dividing the flexible film 1 into a plurality of first regions to be cut; and forming the metal wiring pattern 3 in each first region, as shown in FIG. 2(*a*);

sub-step b-1: stripping the flexible film 1 from the adhesive, as shown in FIG. 2(*b*), each first region of the stripped flexible film 1 having the metal wiring pattern 3; and sub-step c-1: cutting the stripped flexible film 1 having the above metal wiring pattern 3 along boundaries (e.g. dashed lines in FIG. 2(*c*)) of the plurality of first regions to form a plurality of flexible film sheets 10.

The metal wiring pattern is formed on each of the flexible film sheets, as shown in FIG. 2(*d*). A size of the flexible film sheet 10 is equal to a size of the first region. The metal wiring pattern 3 on each of the flexible film sheets 10 may include a plurality of metal wirings 32 and a plurality of metal bonding electrodes 31 connected to the plurality of metal wirings 32 respectively.

It should be noted that it is difficult to form directly a plated film of the metal wirings and to perform a subsequent patterning process on the flexible film since the flexible film is greatly flexible, thus the flexible film is bonded onto a surface of a rigid substrate such as glass substrate with the adhesive to perform subsequent processes.

For example, the adhesive may include optically clear adhesive (abbreviated as OCA) for bonding transparent optical elements.

In addition, the glass motherboard refers to a substrate having a relatively large size for mass production. For a glass substrate used in a generation 6 (G6) production line, the size of the glass motherboard may be 1850 mm×1500 mm.

According to the size of the first region, a large piece of flexible film is cut into a plurality of small pieces, each of which is a flexible film sheet having the same size as the first region. In this way, compared with a process of forming the metal wiring pattern one by one on a single flexible film sheet, a producing efficiency of mass production may be greatly improved by forming the metal wiring pattern on the large piece of flexible film and then cutting the large piece of flexible film.

The dashed lines in FIG. 2(c) are cutting lines for cutting process, that is, boundaries of first regions. Optionally, cutting marks may be formed on the flexible film for marking cutting lines. In an embodiment, the cutting marks may be formed when the metal wiring pattern is formed by etching through one patterning process. In other words, the cutting marks may be formed at the same time when the metal wiring pattern is formed. The cutting marks may be formed from metal material from which the metal wiring pattern is formed. Alternatively, the cutting marks may be formed through additional process and from other material which is not limited herein. As long as the cutting marks can be identified in the cutting process, the specific structure thereof may follow related designs in the related art.

Since there is residual adhesive on the glass motherboard bonding with the flexible film, the glass motherboard cannot be used repeatedly, thereby increasing the cost of the raw material for the glass motherboard. Thus, according to an embodiment of the present disclosure, in the step S02, the glass motherboard form which the flexible film has been stripped may be recovered and processed to facilitate forming the glass substrate on which the touch electrode structure and the plurality of touch bonding electrodes in an electrical connection with the touch electrode structure are formed. The step S02 may specifically include the following sub-steps:

sub-step a-2: recovering the glass motherboard 2 and removing the adhesive remaining on a surface of the glass motherboard, as shown in FIG. 3(a);

sub-step b-2: dividing the glass motherboard into a plurality of second regions to be cut, as shown in FIG. 3(b);

sub-step c-2: forming the touch electrode structure 4 and a plurality of touch bonding electrodes 7 in each second region, as shown in FIG. 3(b) and FIG. 3(e); and sub-step d-2: cutting the glass motherboard 2 having the touch electrode structure and the plurality of touch bonding electrodes along boundaries of the plurality of second regions to form a plurality of glass substrates 20, a size of each of the glass substrate 20 being equal to a size of each of the second regions, as shown in FIG. 3(b) and FIG. 3(e).

Referring to sub-step a-2, depending on specific material types of the adhesive, the adhesive remaining on the surface of the glass motherboard is removed by various methods such as alkaline solution removal and low temperature treatment (0 to 5° C.).

According to the size of the second region, a large piece of glass motherboard is cut into a plurality of small pieces, each of which is a glass substrate having the same size as the second region. In this way, compared with a process of forming structures such as the touch electrode structure and the plurality of touch bonding electrodes on different glass substrates, respectively, a producing efficiency of mass production may be greatly improved by forming the touch electrode structure and the plurality of touch bonding electrodes on each of the second regions of the motherboard and then cutting the glass motherboard.

Cutting marks may also be formed on the glass motherboard for marking cutting lines. The specific structure of the cutting marks may follow related designs in the related art.

Figure 3:
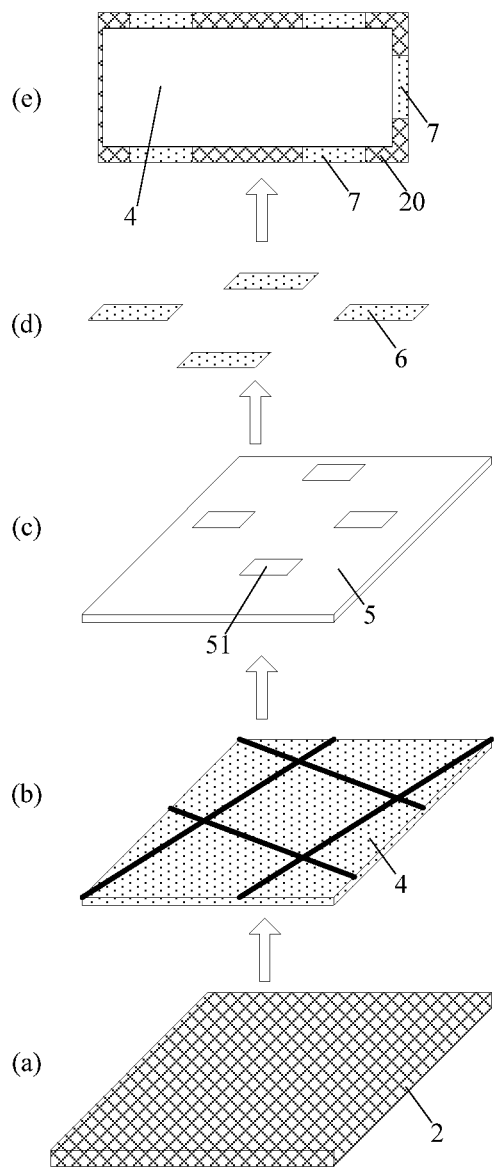
FIG. 3 is a schematic view of corresponding structures in sub-steps of the step S02 of the producing method in FIG. 1.
Figure 4:
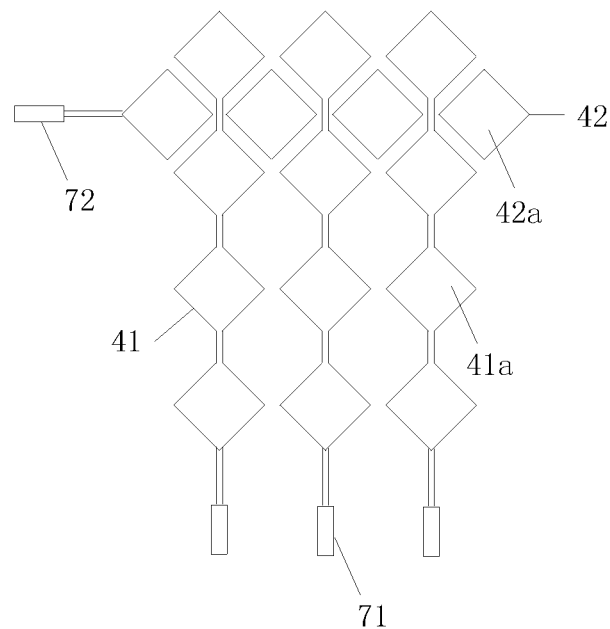
FIG. 4 is a schematic structural view of first electrode, second electrode and touch bonding electrode in FIG. 3.

In an embodiment, the touch electrode structure may use a sheet GF bridging manner. In each second region, the touch electrode structure may include a plurality of first electrodes 41, a plurality of second electrodes 42, and a plurality of bridging electrodes 6; the touch bonding electrodes 7 may include a plurality of first touch bonding electrodes 71 and a plurality of second touch bonding electrodes 72. Referring to FIG. 3, the above sub-step c-2 may specifically include the following sub-steps:

sub-step (1): as shown in FIG. 3(b) and FIG. 4, forming a plurality of first electrodes 41 arranged in parallel with each other, a plurality of second electrodes 42 arranged in parallel with each other, a plurality of first touch bonding electrodes 71 connected to the plurality of first electrodes 41 respectively, and a plurality of second touch bonding electrodes 72 connected to the plurality of second electrodes respectively, in each of the second regions of the glass motherboard 2; the plurality of first electrodes 41 intersecting with the plurality of second electrodes 42, each of the first electrodes 41 including a plurality of first sub-electrodes 41a connected electrically to each other successively, each of the second electrodes 42 including a plurality of second sub-electrodes 42a separated from each other by the first electrodes 41;

sub-step (2): as shown in FIG. 3(c), forming a protective layer 5 which covers at least intersected regions of the plurality of first electrodes 41 and the plurality of second electrodes 42, on the glass motherboard on which the plurality of first electrodes 41, the plurality of second electrodes 42 and the plurality of touch bonding electrodes 7 are formed; and sub-step (3): as shown in FIG. 3(d), forming a plurality of bridging electrodes 6 on the protective layer 5, each of the bridging electrodes 6 being electrically connected to two adjacent second sub-electrodes 42a of one second electrode.

Referring to sub-step (2), in an embodiment, in each second region, the protective layer 5 only covers the intersected regions of the plurality of first electrodes 41 and the plurality of second electrodes 42 to expose the plurality of first sub-electrodes 41a, the plurality of second sub-electrodes 42a, the plurality of first touch bonding electrodes 71, and the plurality of second bonding electrodes 72. In another embodiment, in each second region, the protective layer 5 covers the entire second region. The protective layer 5 is etched to form via holes 51 which expose a part of each of the second sub-electrodes 42a and expose the plurality of first touch bonding electrodes 71 and the plurality of second touch bonding electrodes 72, as shown in FIG. 3(c).

Referring to sub-step (3), In an embodiment, the bridging electrodes 6 go across the protective layer 5 covering the intersected regions of the plurality of first electrodes 41 and the plurality of second electrodes 42 and contact directly two adjacent second sub-electrodes 42a at two sides of the protective layer 5, so that the two adjacent second sub-electrodes 42a are electrically connected. In another embodiment, each of the bridging electrodes 6 is electrically connected to two adjacent second sub-electrodes 42a of one second electrode below the bridging electrode through the via hole 51, so that the two adjacent second sub-electrodes 42a are electrically connected.

In another embodiment, before the sub-step (1), the sub-step c-2 may further include: forming a pattern blanking layer in each second region on the glass motherboard.

The plurality of first electrodes 41, the plurality of second electrodes 42, the plurality of first touch bonding electrodes 71 and the plurality of second bonding electrodes 72 which are subsequently formed are provided on the pattern blanking layer.

The pattern blanking layer is a transition layer formed between a substrate and a transparent electrode such as ITO, so that a difference ΔR % in reflectance between the ITO layer which is not etched and the ITO layer which has been etched to form an electrode pattern is less than 0.5% in the visible light wavelength range. A visual contrast between the ITO area and the non-ITO area is reduced, so that an ITO etching pattern of a capacitive screen seen by the human eyes becomes light and cannot be seen under the normal light, and thus an effect of eliminating the pattern is achieved.

The pattern blanking layer is entirely formed on the glass motherboard by using coating process to simplify the producing process.

In an embodiment, the plurality of first electrodes 41 and the plurality of second electrodes 42 intersecting with each other are formed as Tx electrodes and Rx electrodes. For example, the plurality of first electrodes 41 may be the Tx electrodes while the plurality of second electrodes 42 may be the Rx electrodes. Alternatively, the plurality of first electrodes 41 may be the Rx electrodes while the plurality of second electrodes 42 may be the Tx electrodes.

Specific patterns of the first electrode 41, the second electrode 42 and the bridging electrode 6 may be follow the related art, and embodiments of the present disclosure are not limited thereto.

In an embodiment, the step S03 may specifically include the following steps:

sub-step a-3: bonding an anisotropic conductive adhesive onto a region of the glass substrate where the touch bonding electrodes are formed or a region of the flexible film sheet where the metal wiring pattern is formed;

sub-step b-3: aligning the flexible film sheet with the glass substrate; and sub-step c-3: pressing the flexible film sheet onto the glass substrate so as to connect electrically the plurality of metal bonding electrodes with the plurality of touch bonding electrodes through the anisotropic conductive adhesive.

In the sub-step b-3, a surface of the flexible film sheet on which the metal wiring pattern 3 is formed faces towards a surface of the glass substrate on which the touch electrode structure 4 and the plurality of touch bonding electrodes 7 in an electrical connection with the touch electrode structure are formed. The flexible film is aligned with the glass substrate so that the plurality of touch bonding electrodes 7 are aligned with the plurality of metal bonding electrodes 31, respectively.

Figure 5:
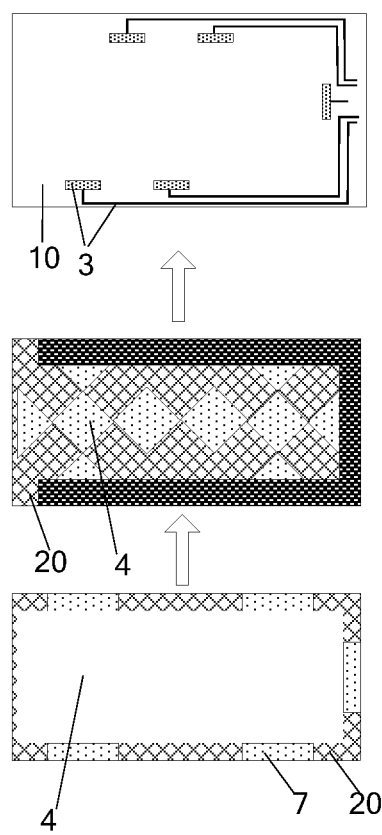
FIG. 5 is a schematic view of corresponding structures in sub-steps of the step S03 of the producing method.

As shown in FIG. 5, as an example, the anisotropic conductive adhesive 8 is bonded on the glass substrate on which the touch electrode structure is formed. Specifically, the anisotropic conductive adhesive 8 is bonded in a periphery of the glass substrate to cover the plurality of touch bonding electrodes 7.

Figure 6:
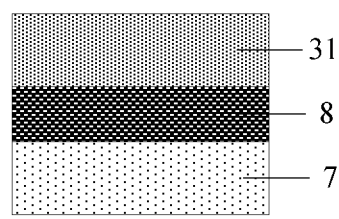
FIG. 6 is a schematic structural view of a laminated structure after the touch bonding electrode and the metal bonding electrode in FIG. 5 are bonded.

The anisotropic conductive adhesive 8 may specifically be a low temperature anisotropic conductive adhesive. After the anisotropic conductive adhesive 8 is pressed and bonded, a conductive connection in a direction perpendicular to a surface of an anisotropic conductive adhesive tape may be realized. As shown in FIG. 6, the plurality of metal bonding electrodes 31 are electrically connected with the plurality of touch bonding electrodes 7, so that a touch sensor with low channel impedance and low power consumption can be obtained.

In an embodiment, a profile of the formed flexible film sheet 10 is larger than a profile of the formed glass substrate 20. After the flexible film sheet is aligned with and bonded with the glass substrate, the flexible film sheet further includes at least one edge region which is not bonded with a surface of the glass substrate facing towards the flexible film sheet. In this way, after the flexible film sheet is aligned with and bonded with the glass substrate, the edge region of the flexible film sheet may be curved towards the glass substrate. For example, at least edge regions of the flexible film sheet at two opposite sides of the glass substrate may be curved towards the glass substrate. Thus, it can be applied in a curved display screen.

Furthermore, as the metal has good ductility and good bendability, the metal wirings on the flexible film sheet may be arranged at least in the above edge region of the flexible film sheet, so that not only the formed touch sensor has low power consumption, but also a bend edge of the touch sensor can be permitted.

Another embodiment of the present disclosure may provide a producing method of a touch panel. The touch panel includes a touch substrate and a cover plate on the touch substrate. The producing method of a touch panel may include steps of:

producing the touch substrate by using the above-mentioned producing method of a touch substrate, in the touch substrate, a profile of the flexible film sheet being larger than a profile of the glass substrate, the flexible film sheet further including at least one edge region which is not bonded with a surface of the glass substrate facing towards the flexible film sheet; and pressing the cover plate with curved edges against a surface of the flexible film sheet facing away from the glass substrate, so that the edge region of the flexible film sheet is curved towards the glass substrate and conformed to the curved edges of the cover plate.

Figure 7:
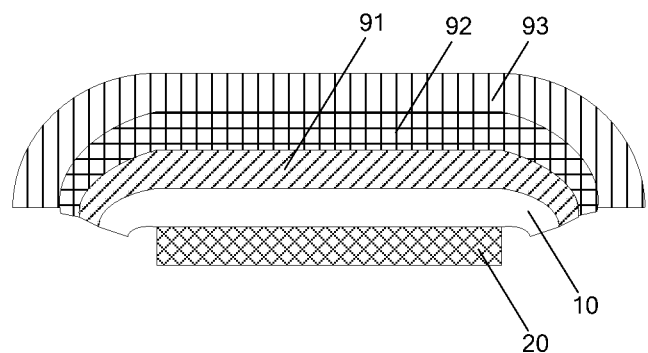
FIG. 7 is a schematic structural cross-view of a touch panel according to an embodiment of the present disclosure.

As shown in FIG. 7, the cover plate 93 is pressed against a surface of the flexible film sheet 10 facing away from the glass substrate 20. At least a pair of opposite edges of the cover plate 93 are curved. In this way, the edge region of the flexible film sheet is curved towards the glass substrate and conformed to the curved edges of the cover plate 93.

In an embodiment, as shown in FIG. 7, before the step of pressing the cover plate with curved edges against a surface of the flexible film sheet facing away from the glass substrate, the producing method of the touch panel may further include: forming a polarized layer 91 on the surface of the flexible film sheet facing away from the glass substrate, a profile of the polarized layer 91 being larger than the profile of the flexible film sheet 10; and forming an ink layer 92 on the polarized layer, a profile of the ink layer 92 being larger than a profile of the polarized layer 91.

It will be easily understood by those skilled in the art that the steps of forming the polarized layer and forming the ink layer are not essential. In an embodiment, only one of the polarized layer and the ink layer may be formed.

An embodiment of the present disclosure may further provide a touch substrate. Referring to FIG. 7 and FIG. 2(*d*) and FIG. 3(*e*), the touch substrate includes a flexible film sheet 10 and a glass substrate 20 opposite to each other. A metal wiring pattern is provided on a side of the flexible film sheet 10 facing towards the glass substrate. The metal wiring pattern includes a plurality of metal wirings and a plurality of metal bonding electrodes connected to the plurality of metal wirings respectively. A touch electrode structure and a plurality of touch bonding electrodes are provided on a side of the glass substrate 20 facing towards the flexible film sheet. Both a sheet resistance of the touch electrode structure and a sheet resistance of the touch bonding electrodes range from 12 Ω/□ to 70 Ω/□. The plurality of metal bonding electrodes are bonded with and electrically connected to the plurality of touch bonding electrodes respectively.

A structure of the above touch substrate may solve a problem that the sheet resistance inherently contained in the common Cop material cannot be reduced, thereby reducing the power consumption of product.

The touch substrate may further include an anisotropic conductive adhesive between the metal wiring pattern and the touch bonding electrodes. The anisotropic conductive adhesive connects electrically the metal bonding electrodes with the touch bonding electrodes.

In an embodiment, as shown in FIG. 7, a profile of the flexible film sheet 10 is larger than a profile of the glass substrate 20. The flexible film sheet further includes at least one edge region which is not bonded with a surface of the glass substrate facing towards the flexible film sheet. The edge region of the flexible film sheet may be curved towards the glass substrate. For example, at least edge regions of the flexible film sheet at two opposite sides of the glass substrate may be curved towards the glass substrate. Thus, it can be applied in a curved display screen.

Furthermore, since the metal has good ductility and good bendability, the metal wirings on the flexible film sheet may be provided at least in the above-mentioned edge region of the flexible film sheet, so that not only the formed touch sensor has low power consumption, but also a bend edge of the touch sensor can be permitted.

An embodiment of the present disclosure may further provide a touch panel including the above-mentioned touch substrate.

As shown in FIG. 7, the touch panel further includes a polarized layer 91, an ink layer 92 and a cover plate 93 which are arranged away from the flexible film sheet 10 in sequence.

In the touch panel according to the embodiment, a profile of the flexible film sheet 10 is larger than a profile of the glass substrate 20. The flexible film sheet further includes at least one edge region which is not bonded with a surface of the glass substrate facing towards the flexible film sheet.

A profile of the polarized layer 91 is larger than the profile of the flexible film sheet 10. A profile of the ink layer 92 is larger than the profile of the polarized layer 91. And a profile of the cover plate 93 is larger than the profile of the ink layer 92.

The flexible film sheet 10, the polarized layer 91 and the ink layer 92 are all flexible and bendable. The cover plate 93 is made of a rigid material. At least one pair of opposite edges of the cover plate 93 is curved, so that edges of the flexible film sheet 10, the polarized layer 91 and the ink layer 92 are curved towards the glass substrate and conformed to the curved edges of the cover plate.

The cover plate 93 is, for example, a stereoscopic 3D (3-dimensional) cover plate.

It will be easily understood by those skilled in the art that the steps of forming the polarized layer and forming the ink layer are not essential, for example, only one of the polarized layer and the ink layer may be formed, or none of the polarized layer and the ink layer is formed.

An embodiment of the present disclosure further provides a display device including a display panel and the above-mentioned touch panel. The display panel is located on a side of the glass substrate away from the flexible film sheet. The display panel may be LCD, OLED, etc.

The display device may specifically be a digital photo frame, a mobile phone, a tablet computer, a navigator, a wearable device such as a wristband or a wrist strap, or any product or component having any display function.

The foregoing descriptions are merely specific implementation manners of the present disclosure, but the scope of the present disclosure is not limited thereto. Any person skilled in the art can easily think of changes or replacements within the technical scope disclosed by the present disclosure. These changes or replacements should be covered by the scope of the present disclosure. Therefore, the scope of the present disclosure should be defined by the protection scope of appended claims.

What is claimed is:

1. A method of producing a touch substrate, comprising steps of:
    forming at least one flexible film sheet with a metal wiring pattern, the metal wiring pattern comprising metal wirings and metal bonding electrodes connected to the metal wirings respectively;
    forming at least one glass substrate on which a touch electrode structure and touch bonding electrodes in electrical connection with the touch electrode structure are formed, both a sheet resistance of the touch electrode structure and a sheet resistance of the touch bonding electrodes ranging from 12 Ω/□ to 70 Ω/□; and
    aligning and bonding the at least one flexible film sheet with the at least one glass substrate,
    wherein the touch electrode structure comprises a plurality of first electrodes arranged in parallel with each other and a plurality of second electrodes arranged in parallel with each other, the plurality of first electrodes intersecting with the plurality of second electrodes.

2. The method of claim 1, wherein the step of forming the at least one flexible film sheet with the metal wiring pattern comprises steps of:
    bonding a flexible film onto a glass motherboard with an adhesive;
    dividing the flexible film into at least one first region;
    forming the metal wiring pattern in each first region;
    stripping the flexible film from the adhesive; and
    cutting the flexible film along a boundary of the at least one first region to form the at least one flexible film sheet with the metal wiring pattern.

3. The method of claim 2, wherein the step of forming the at least one glass substrate on which the touch electrode structure and touch bonding electrodes in electrical connection with the touch electrode structure are formed comprises steps of:
    recovering the glass motherboard and removing the adhesive remaining on the glass motherboard;
    dividing the glass motherboard into at least one second region;
    forming the touch electrode structure and the touch bonding electrodes in each second region; and
    cutting the glass motherboard along boundary of the at least one second region to form the at least one glass substrate on which the touch electrode structure and the touch bonding electrodes in electrical connection with the touch electrode structure are formed.

4. The method of claim 3, wherein the step of forming the touch electrode structure and the touch bonding electrodes in each second region comprises steps of:

forming a plurality of first electrodes arranged in parallel with each other, a plurality of second electrodes arranged in parallel with each other, a plurality of first touch bonding electrodes connected to the plurality of first electrodes respectively, and a plurality of second touch bonding electrodes connected to the plurality of second electrodes respectively, the plurality of first electrodes intersecting with the plurality of second electrodes, each of the first electrodes comprising a plurality of first sub-electrodes connected electrically to each other successively, each of the second electrodes comprising a plurality of second sub-electrodes separated from each other by the first electrodes;

forming a protective layer which covers at least intersected regions of the first electrodes and the second electrodes; and forming a plurality of bridging electrodes on the protective layer, each of the bridging electrodes being electrically connected to two adjacent second sub- electrodes of one second electrode.

5. The method of claim 4, wherein the protective layer covers the entire second region, and the method further comprises a step of:

etching the protective layer to form via holes which expose a part of each of the second sub-electrodes and expose the plurality of touch bonding electrodes, the bridging electrodes being electrically connected to the second sub- electrodes through the via holes.

6. The method of claim 3, wherein before the step of forming the touch electrode structure and the touch bonding electrodes in each second region, the method further comprises a step of:

forming a pattern blanking layer covering each second region on the glass motherboard.

7. The method of claim 1, wherein the step of aligning and bonding the at least one flexible film sheet with the at least one glass substrate comprises steps of:

bonding an anisotropic conductive adhesive onto a region of the at least one glass substrate where the touch bonding electrodes are formed or a region of the at least one flexible film sheet where the metal bonding electrodes are formed;

aligning the at least one flexible film sheet with the at least one glass substrate to align the touch bonding electrodes with the metal bonding electrodes; and pressing the at least one flexible film sheet against the at least one glass substrate so as to electrically connect the metal bonding electrodes with the touch bonding electrodes through the anisotropic conductive adhesive.

8. A method of producing a touch panel, wherein the touch panel comprises a touch substrate and a cover plate on the touch substrate, and the producing method comprises steps of:

producing the touch substrate by using the producing method of claim 1, wherein the touch substrate is characterized by a profile of the at least one flexible film sheet being larger than a profile of the at least one glass substrate, the at least one flexible film sheet further comprising at least one edge region which is not bonded with a surface of the at least one glass substrate facing towards the at least one flexible film sheet; and pressing the cover plate with a curved edge against a surface of the at least one flexible film sheet facing away from the at least one glass substrate, so that the edge region of the at least one flexible film sheet is curved towards the at least one glass substrate and conforms to the curved edge of the cover plate.

9. The method of claim 8, wherein before the step of pressing the cover plate with the curved edge against the surface of the at least one flexible film sheet facing away from the at least one glass substrate, the method further comprises a step of:

forming at least one of a polarizer layer and an ink layer on the surface of the at least one flexible film sheet facing away from the at least one glass substrate.

10. The method of claim 8, wherein the edge region of the at least one flexible film sheet is at least positioned at two opposite sides of the at least one glass substrate.

11. The method of claim 8, wherein the metal wirings are at least positioned in the edge region of the at least one flexible film sheet.

\* \* \* \* \*